United States Patent
Kemker et al.

(10) Patent No.: US 9,462,914 B2
(45) Date of Patent: Oct. 11, 2016

(54) FOOD PROCESSOR

(71) Applicants: Uwe Kemker, Wuppertal (DE); Uwe Caldewey, Dortmund (DE); Georg Hackert, Bochum (DE); Frank Starflinger, Bochum (DE)

(72) Inventors: Uwe Kemker, Wuppertal (DE); Uwe Caldewey, Dortmund (DE); Georg Hackert, Bochum (DE); Frank Starflinger, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 211 days.

(21) Appl. No.: 14/506,266

(22) Filed: Oct. 3, 2014

(65) Prior Publication Data
US 2015/0023133 A1    Jan. 22, 2015

Related U.S. Application Data

(63) Continuation of application No. PCT/EP2013/056973, filed on Apr. 3, 2013.

(30) Foreign Application Priority Data

Apr. 4, 2012    (DE) .................. 10 2012 102 940

(51) Int. Cl.
*A47J 43/07*    (2006.01)
*B05B 3/00*    (2006.01)
*B05B 3/14*    (2006.01)
*B05B 11/00*    (2006.01)

(52) U.S. Cl.
CPC ............. *A47J 43/07* (2013.01); *A47J 43/0716* (2013.01); *B05B 3/00* (2013.01); *B05B 3/14* (2013.01); *B05B 11/3074* (2013.01)

(58) Field of Classification Search
CPC .............................. A47J 43/07; A47J 43/046
USPC ..................................................... 366/205, 314
See application file for complete search history.

(56) References Cited

U.S. PATENT DOCUMENTS

| | | | | |
|---|---|---|---|---|
| 2,595,985 A | * | 5/1952 | Schwaneke | A47J 43/07 416/203 |
| 3,344,829 A | * | 10/1967 | Ripple | A47J 43/046 241/282 |
| 5,749,285 A | * | 5/1998 | Dorner | A47J 36/165 366/146 |

(Continued)

FOREIGN PATENT DOCUMENTS

| DE | 10210442 A1 | 9/2003 |
|---|---|---|
| DE | 102011051149 A1 | 4/2012 |

OTHER PUBLICATIONS

International Search Report Application No. PCT/EP2013/056973 Completed: Jun. 17, 2013; Mailing Date: Jun. 24, 2013 pp. 4.

*Primary Examiner* — David Sorkin
(74) *Attorney, Agent, or Firm* — St. Onge Steward Johnston & Reens, LLC

(57) ABSTRACT

A food processor having a standing surface at the bottom, a rear side and a front side, wherein the front side, starting from the highest location of the food processor, is formed obliquely and contains a holder for a cooking vessel. Freely projecting rod parts are formed in an upper region of the food processor, wherein the front ends of the rod parts are arranged on the same horizontal plane and are set back. To improve handling further, it is proposed that the set-back amount should correspond to 25% to 50% of the largest extent of the food processor as seen in the depthwise direction in the standing-surface region of the food processor. The amount also corresponds to approximately half the horizontal distance between the longitudinal centre axes of the rod parts. The contour of the front side is always rounded in the region of the rod parts.

8 Claims, 7 Drawing Sheets

(56) References Cited

U.S. PATENT DOCUMENTS

| | | | |
|---|---|---|---|
| 2002/0080678 A1* | 6/2002 | Daniels, Jr. | A47J 43/046 366/205 |
| 2010/0027373 A1* | 2/2010 | Barnard | A47J 43/0761 366/347 |
| 2016/0120367 A1* | 5/2016 | Braun | A47J 43/0727 366/314 |
| 2016/0120370 A1* | 5/2016 | Starflinger | A47J 43/0716 366/314 |

* cited by examiner

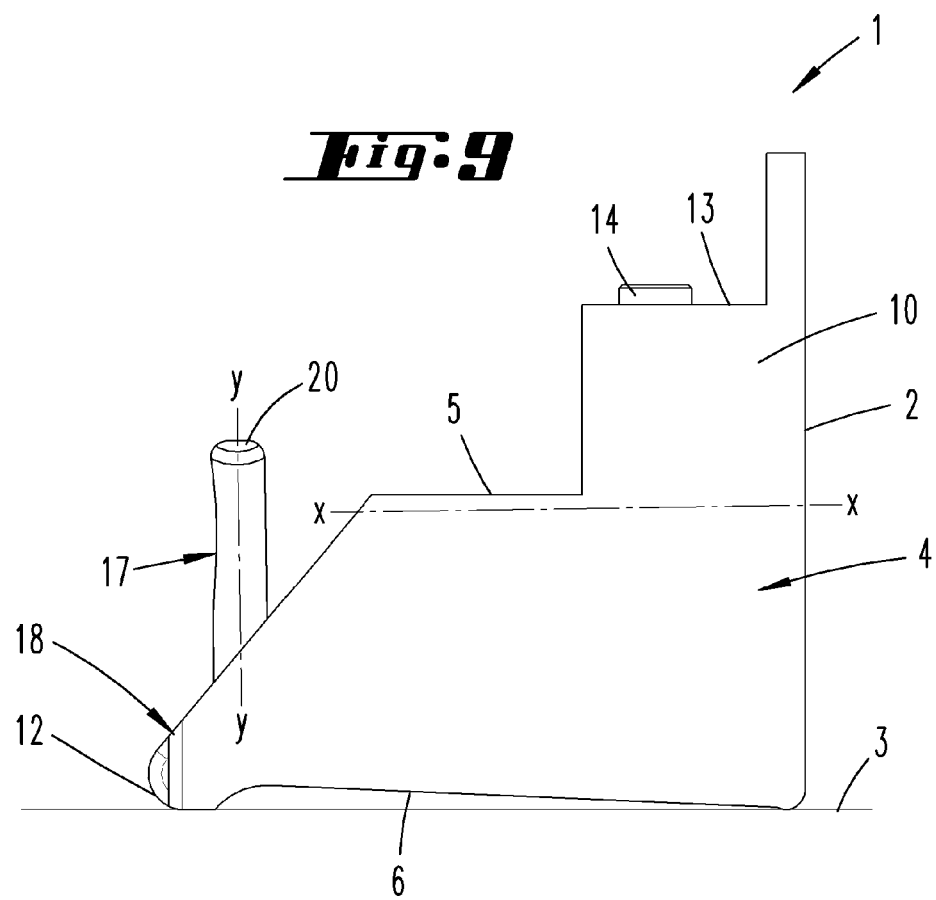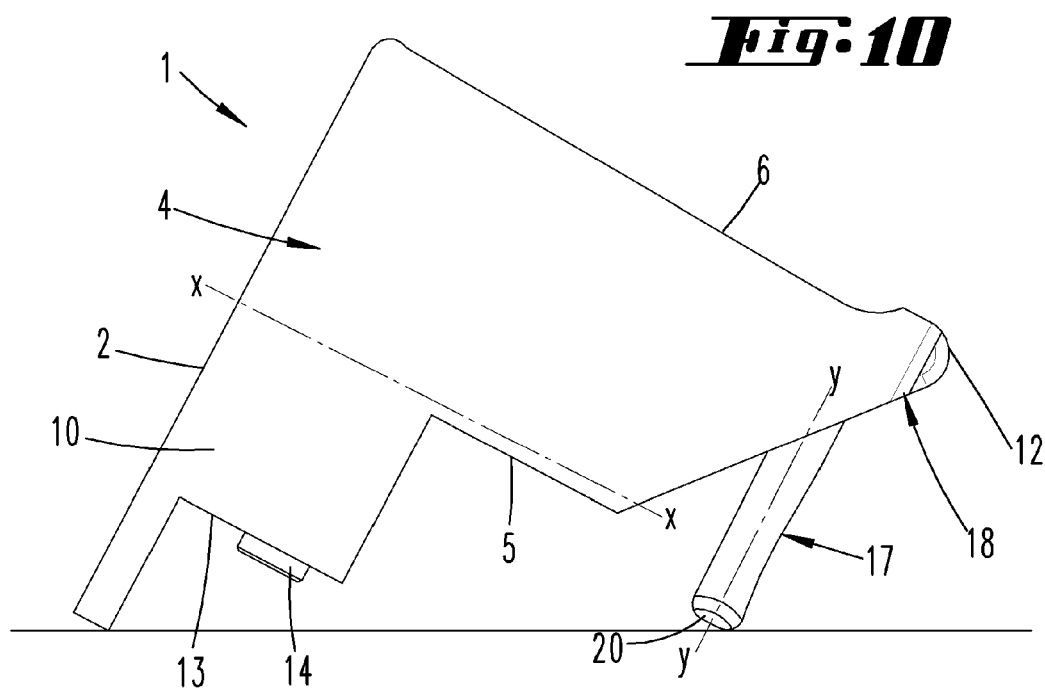

FOOD PROCESSOR

FIELD OF THE INVENTION

The invention relates to a food processor having a lower standing surface, a rear side and a front side, wherein the front side, starting from the highest location of the food processor, said location being assigned to the rear side, is formed obliquely in relation to a vertical and contains a holder for a cooking vessel in the front side, wherein, furthermore, freely projecting rod parts are formed in an upper region of the food processor, wherein the front ends of the rod parts are arranged on the same horizontal plane and are set back toward the rear side of the food processor with respect to a furthest-forward-projecting extent.

BACKGROUND OF THE INVENTION

Food processors of the aforementioned type are known. These food processors are used in particular in the domestic field in order to produce or prepare meals, for which purpose a cooking vessel assignable to the food processor is designed to receive foodstuffs, for example cooked foods or fluids. In this context, food processors are also known that have an agitator operable by means of electric motor and/or that have a heating device, preferably in the cooking vessel.

Reference is also made by way of example to DE 102 10 442 A1, and also additionally by way of example to DE 10 2011 051149 A1. This patent application discloses a food processor that has a standing surface running substantially two-dimensionally in order to stand the food processor for example on a working surface. A rear side extends from this standing surface substantially in a vertical plane in relation to the standing surface. The front side, which in particular faces the user during use of the food processor, drops away substantially starting from the vertically highest region of the rear side in the direction of the end of the standing surface facing the front side, and does so in a substantially stepped manner, more preferably with projections and recesses as considered over the width of the front side.

A pot-like vertical indentation is provided in the region of the front side in order to vertically receive the cooking vessel, wherein the holder is preferably formed such that the received cooking vessel is contained in a substantially contour-matched manner in particular in the region of the vessel base, wherein the holder also has a holder base, which substantially supports the cooking vessel.

In this regard, it is also known to form the holder in such a way that a central vessel axis simultaneously receiving the agitator axis of rotation where applicable, is oriented vertically in the received cooking vessel position. In this context, it also known to form the front side of the food processor with freely projecting rod parts, in particular two rod parts distanced from one another on a common horizontal plane.

An arrangement of this type, in which the rod parts fixed substantially in the transition region from the front side and rear side in the food processor and projecting freely herefrom are used to fix a lid covering the cooking vessel during cooking operation, is known from the previously referenced document DE 10 2011 051149 A1. The ends of the rod parts opposite the attachment of the rod parts to the food processor are offset with respect to a vertical projection onto the standing surface of the food processor in the direction of the rear side of the food processor, distanced accordingly from a contour line of the front side distanced maximally from the rear side, as considered in the vertical projection onto the standing surface.

SUMMARY OF THE INVENTION

In view of the above-described prior art, a technical problem of the invention is considered that of further improving a food processor of the discussed type, in particular with regard to favorable handling.

In accordance with a first inventive concept, a possible solution to the problem is provided with a food processor in which it is proposed that the set-back amount corresponds to 25 percent to 50 percent, more preferably approximately one third, of the greatest extent of the food processor in the depthwise direction (from rear side to front side) in the standing-surface region of the food processor, wherein the amount, at the same time, corresponds to approximately half, more preferably 40 percent to 60 percent, of the horizontal distance between the longitudinal center axes of the rod parts, wherein, furthermore, the contour of the front side is always rounded in the region of the rod parts.

As a result of this embodiment, a food processor is specified which provides the same advantages, in particular in terms of the handling. As a result of the previously described arrangement and orientation, the rod parts can be used advantageously for example as carry handles for the food processor, for example in order to change the location of the food processor. The rod parts are for this purpose distanced both from one another and from the front side in a favorable position and at a favorable spacing.

The rod parts are thus preferably arranged such that a favorable weight distribution is achieved. In addition, the arrangement of the rod parts is favorably selected, preferably in respect to the center of gravity of the food processor. The food processor can thus be carried favorably in the simplest manner in front of the body of the user, here also with the region of the front side distanced maximally from the rear side resting against the body where appropriate.

The preferred distance of the free ends of the rod parts from the front-side contour distanced maximally from the rear side and also the spacing of the rod parts from one another in the horizontal direction mean that the food processor can be carried in an ergonomically favorable manner.

In addition, the rod parts can also be used favorably as spacer or support elements, which for example allows the food processor to be stood upside-down, for example for cleaning or repair purposes. Here, a small support, substantially over points or at least over an area, of the food processor is enabled in any case via the rod parts, in particular via the regions of the free ends of the rod parts and a sub-region of the front side, more particularly via the rod parts and the contour of the front side assigned to the standing surface or via the rod parts and the region of the rounded contour of the front side between the rod parts.

In particular as a result of support via the rod parts or via the free end regions of the rod parts, a stable standing of the food processor deviating from the usual position of use can be achieved, moreover also in conjunction with the front-side contour rounded in the vertically upper region of the front side assigned to the rod parts, as is preferred. Due to the arrangement of the rod parts and the resultant usable support in particular via the end regions of the rod parts, the food processor is also supported merely at points or at least over a small area in the region of the front side, for example in an upside-down position of the food processor. The substantially greater area of the front side beyond the support over points or a small area is also unstressed in such an upside-down position of the food processor, whereby a scratching of the front-side surface over a large area is avoided, for example.

The standing surface is preferably substantially two-dimensional. The standing surface may be determined by the supporting surfaces of stand feet.

Further features of the invention will be explained hereinafter, also in the description of the figures, often in the preferred assignment thereof to the subject matter of present teachings. However, the further features may also be of significance in an assignment to only individual features of present teachings.

In accordance with a further preferred embodiment, the control panel is part of a continuous front side, which is oblique or angled (vertically) in cross section. The front side is preferably formed continuously over the entire height, here also more preferably over the entire width, and more preferably is at least approximately two-dimensional, here preferably having no projections and recesses beyond the front-side plane, in particular beyond a double-digit millimeter range, at least with respect to the front-side housing design. Here, an exception is constituted by the holder for the cooking vessel. The front side of the food processor is preferably formed with a smooth surface surrounding this holder substantially.

Here, the front side, in a side view, preferably adopts an oblique angle with respect to the food processor, more preferably at least partially an oblique angle from 30 to 60 degrees, more preferably approximately 45 degrees.

A control panel for the food processor is provided on the front side or, as is more preferable, is integrated into the front side. In particular, this control panel comprises keys, buttons, such as rotary knobs, or other switches for operating the food processor, and additionally more preferably comprises a display for displaying parameters to be set via the switches. A touchscreen display may also be provided in the control panel, additionally or alternatively.

A switch, and where applicable also all switches, protrudes/protrude in one embodiment beyond the preferably continuous assigned surface of the front side. An embodiment in which the plane of the control panel preferably transitions continuously into the further plane of the front side extending in the direction of the rear side is also possible.

The rear side, in relation to a side view, more preferably runs at an incline toward the front side, enclosing an acute angle to a vertical, wherein the edge termination of the front side protrudes partially beyond the rear side in a vertical projection. Here, the rear side more preferably extends at an incline toward the front side at an acute angle from 5 to 30 degrees, more preferably 10 to 20 degrees, with respect to a vertical arranged on the standing surface of the food processor.

The front edge, via the region thereof facing the rear side, which region may also only be visible in this respect in a plan view, preferably protrudes beyond the rear side in a collar-like manner. The amount by which the front side protrudes beyond the rear side is more preferably selected such that the protruding region does not project beyond the standing surface in a vertical projection with respect to the rear side of the food processor.

The amount by which the front side protrudes beyond the rear side horizontally, that is to say considered substantially parallel to the standing surface, is more preferably selected such that an edge contour of the front side extends between the vertically lower contour of the rear side assigned to the standing surface and the vertically upper edge contour of the rear side assigned to the front side. In a preferred embodiment, the amount by which the front side protrudes beyond the vertically upper contour of the rear side assigned to the front side corresponds to approximately one quarter to three quarters of the spacing, considered transversely to the vertical, between the upper contour of the rear side assigned to the front side and the vertically lower contour of the rear side assigned to the standing surface. As a result of this embodiment, the food processor can be set down virtually on the rear side thereof, for example for cleaning or repair purposes, without resting the rear side of the food processor over the entire area thereof on a working surface or the like. Support is preferably provided merely at points or in the region of small areas, particularly in the vertically lower region of the rear side assigned to the standing surface (substantially in the region of transition from the rear side to the standing surface) and in the region of the front side protruding beyond the rear side.

The edge of the front side more preferably runs continuously in a straight or curved line, at least starting with the height of the rod parts, more preferably in the case of curvature with a maximum extent between the rod parts. Here, the curvature is more preferably provided with a radius that changes over the course of the curvature or with a constant radius, more preferably with an increasing radius of curvature starting from a rod part in the direction of the zenith of the curvature, or running in a straight line between the rod parts. The vertical spacing, considered with ordinary operating position of the food processor, between the zenith of the edge of the front side produced between the rod parts in the case of a curvature and the center axes of the rod parts arranged on a common horizontal plane, irrespective of an embodiment of the edge, preferably corresponds to one quarter to one tenth, more preferably one fifth to one sixth, of the horizontal spacing of the center axes of the rod parts relative to one another.

In a more preferred embodiment, the greatest width of the front side is formed beneath the rod parts, more preferably approximately vertically centrally between the rod parts and the standing surface, more preferably in relation to a projection in a vertical plane. The greatest width of the front side more preferably corresponds here to approximately 1.5 to 2.5 times the horizontal spacing between the rods parts in the region of the center axis thereof. In this context, the horizontal spacing of the rod parts relative to one another in relation to the center axes thereof also corresponds from 40 percent to 60 percent of the greatest width of the front side.

In the case of a rectangular or square contour (plan view), the greatest width may also be the width per se.

In a more preferred embodiment, a grip region that can be grasped is formed in the region of the maximum extent, more preferably in the region of front side and more preferably rear side produced between the rod parts. This provides the possibility of carrying the food processor, for example in the case that a cooking vessel is received in the holder of the food processor, the lid of said cooking vessel for example being fixed by the rod parts formed for example as fastening means. In this case of use, it may not be possible to use the rod parts as carrying handles or to only use the rod parts in this way to a limited extent. The grip region, which can be grasped, accordingly has a reach-through opening, which opens both toward the front side and preferably toward the rear side, whereas the grip region is more preferably formed from the preferably curved contour in particular of the front side. This grip region also provides favorable handling, for example for tilting the food processor out from the usual position of use into a cleaning and/or repair position, in which the food processor is placed on a working surface or the like in a manner supported on the rear side or with use of the rod parts.

The freely projecting length of the rod parts, that is to say accordingly the free length of the rod parts starting from the penetration plane to the front side, corresponds, in relation to a center axis of said rod parts, to preferably 20 to 50 percent of the maximum depth of the food processor, said maximum depth of the food processor being provided more preferably in the region of the standing surface. This freely projecting length of the rod parts more preferably corresponds approximately to one third of the maximum depth of the food processor.

In addition, the longitudinal axes of the rod parts preferably enclose, over the entire freely projecting length of the rod parts (in relation to a side view), an acute angle to the front side, in particular an acute angle from 15 to 60 degrees, more preferably approximately 45 degrees. The longitudinal axes of the rod parts extend here preferably in a parallel plane in relation to the standing surface, and accordingly in a horizontal plane in the usual position of use in the food processor. The freely projecting length of the rod parts beyond the plane of the front side and also the enclosed acute angle between the longitudinal axes of the rod parts and the front side advantageously provide sufficient space for the user to grasp below and around the rod parts. In addition, a sufficient spacing between the front side and a working surface or the like when setting down the food processor with use of a support on the rod parts is provided.

The ranges or value ranges or multiple ranges specified above and below also include, in terms of the disclosure, all intermediate values, in particular in ⅒ steps of the respective dimension, that is to say possibly also without dimension, in particular 1.01 times, etc. on the one hand in order to delimit the specified range limits from below and/or above, but also alternatively or additionally in view of the disclosure of one or more singular values from the respective specified range.

BRIEF DESCRIPTION OF THE DRAWINGS

The invention will be explained hereinafter on the basis of the accompanying drawing, however this represents merely an exemplary embodiment. In the drawing:

FIG. 9 shows a side view according to FIG. 2 toward the food processor without agitator with the food processor set down in the region of the rear side thereof;

FIG. 10 shows an illustration corresponding to FIG. 9, but with the food processor set down via a sub-region of the front side and rod parts projecting freely beyond the front side.

DETAILED DESCRIPTION OF THE INVENTION

An electrically operated food processor 1 is illustrated and will be described initially with reference to FIG. 1. This food processor firstly has a lower standing surface 2 running substantially two-dimensionally for supporting the food processor 1 on a surface 3, for example a working surface in the usual position of use of the food processor 1 according to the illustrations in FIGS. 1 and 2.

Figure 4:
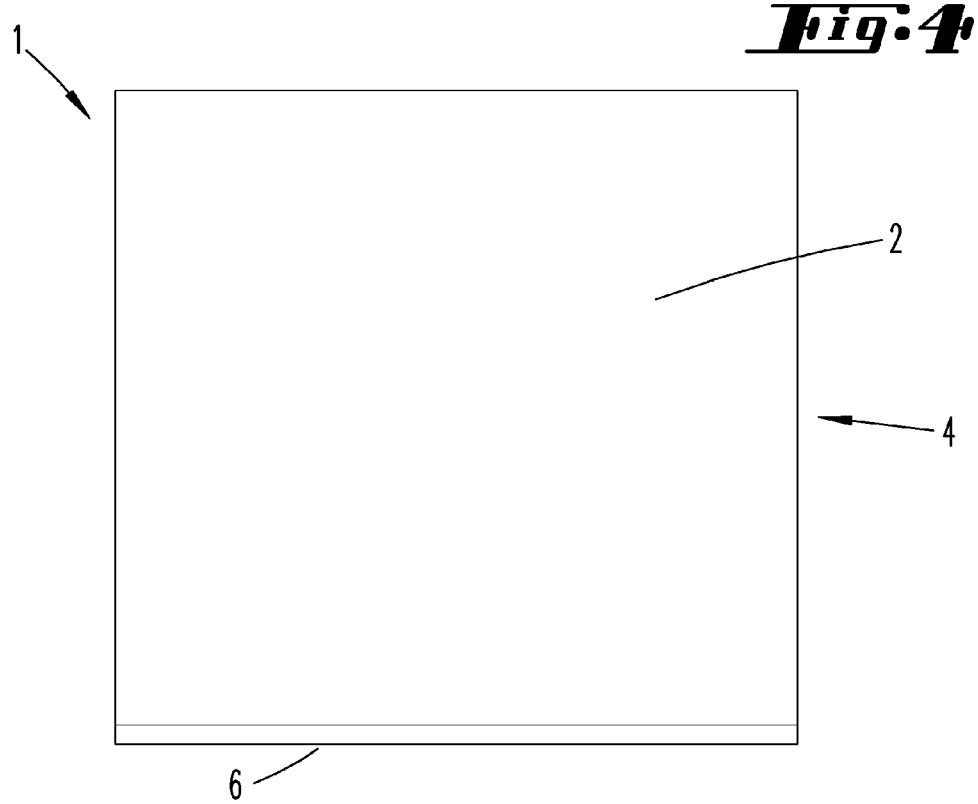
FIG. 4 shows the view from beneath in relation hereto.
Figure 5:
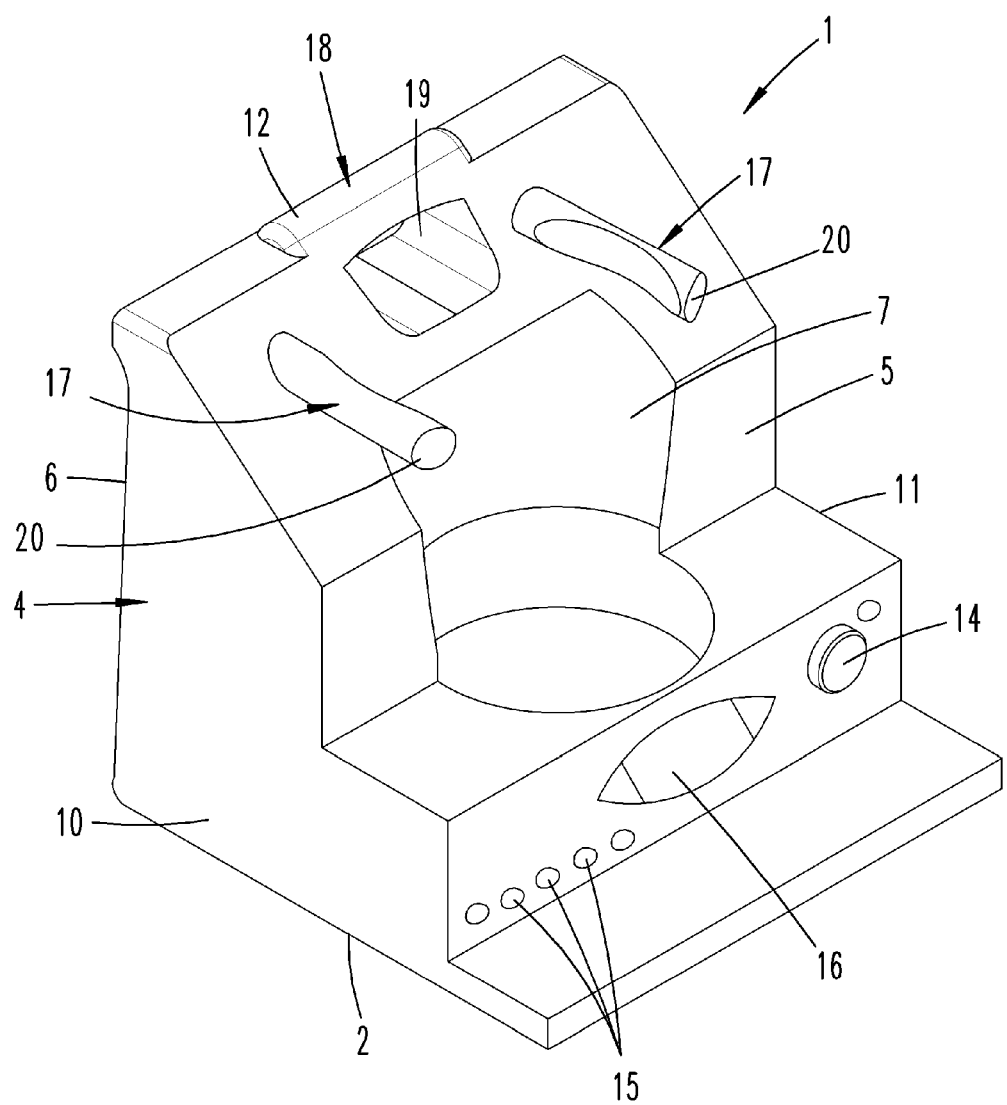
FIG. 5 shows the food processor in a perspective illustration.

The standing surface 2 is formed substantially by the base of a machine housing 4, wherein the standing surface 2 according to the illustration in FIG. 4 further has substantially a square design, with sharp edges. The edges may also be rounded. However, the edges may also have a triangle design, with heavily rounded corner regions, and more preferably an outwardly directed contour, shaped in the manner of a circular line portion, between the corner regions. In the case of a triangle design, a heavily rounded triangle tip of the standing surface 2 may point toward the front face 5 in the usual position of use of the food processor 1. With reference to a side view according to FIG. 2, the front side 5 in any case runs in a sub-region at an acute angle $\beta$ of approximately 45° to the plane defined by the standing surface 2 (synonymous here with a horizontal through the axis y-y, which is also explained in greater detail further below). The front side may also be formed in a manner rising preferably at least approximately uniformly starting from the attachment in the region of the standing surface 2 in the direction of the rear side 6, however this is not illustrated.

Figure 3:
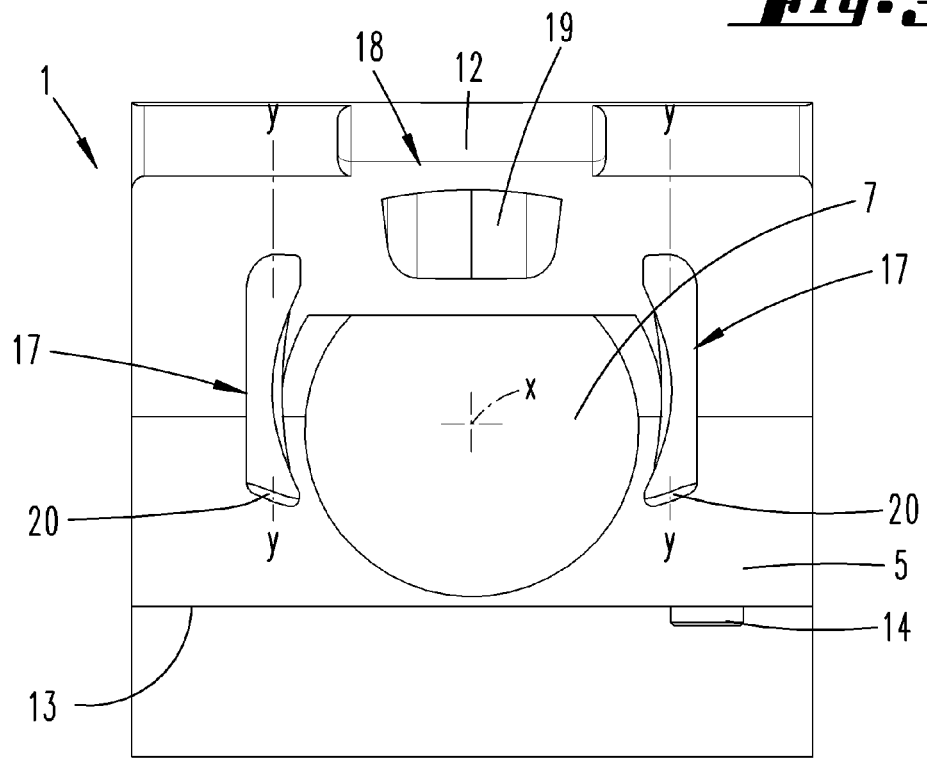
FIG. 3 shows the plan view of the food processor.
Figure 6:
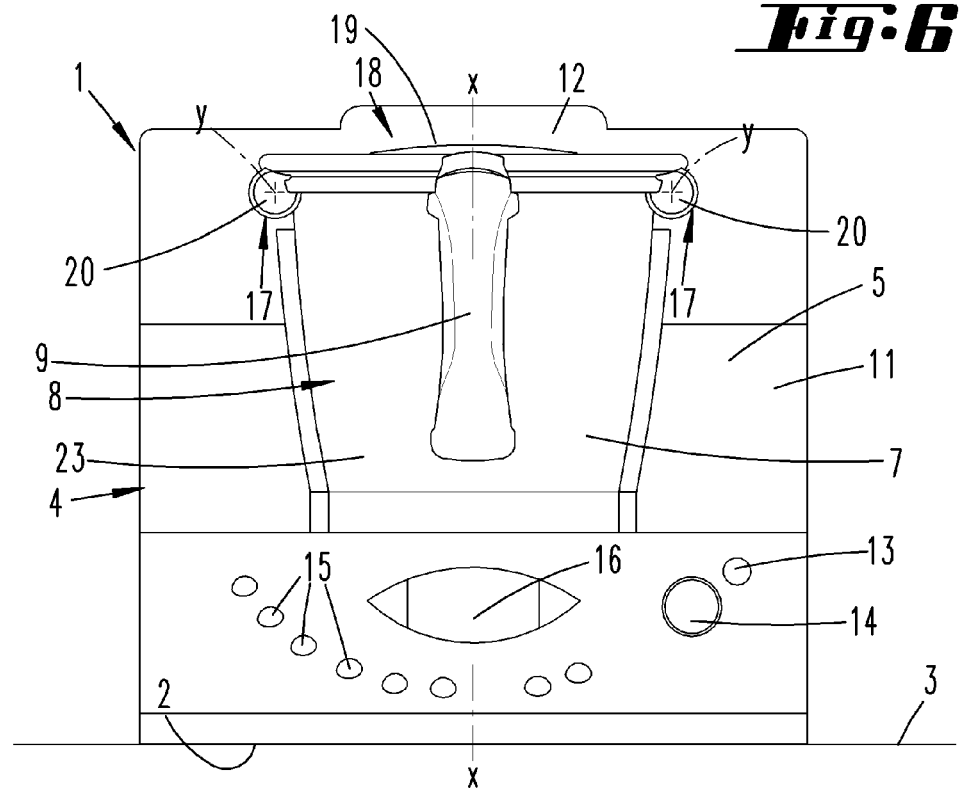
FIG. 6 shows an illustration corresponding to FIG. 1, but with arrangement of a cooking vessel in the food processor.
Figure 7:
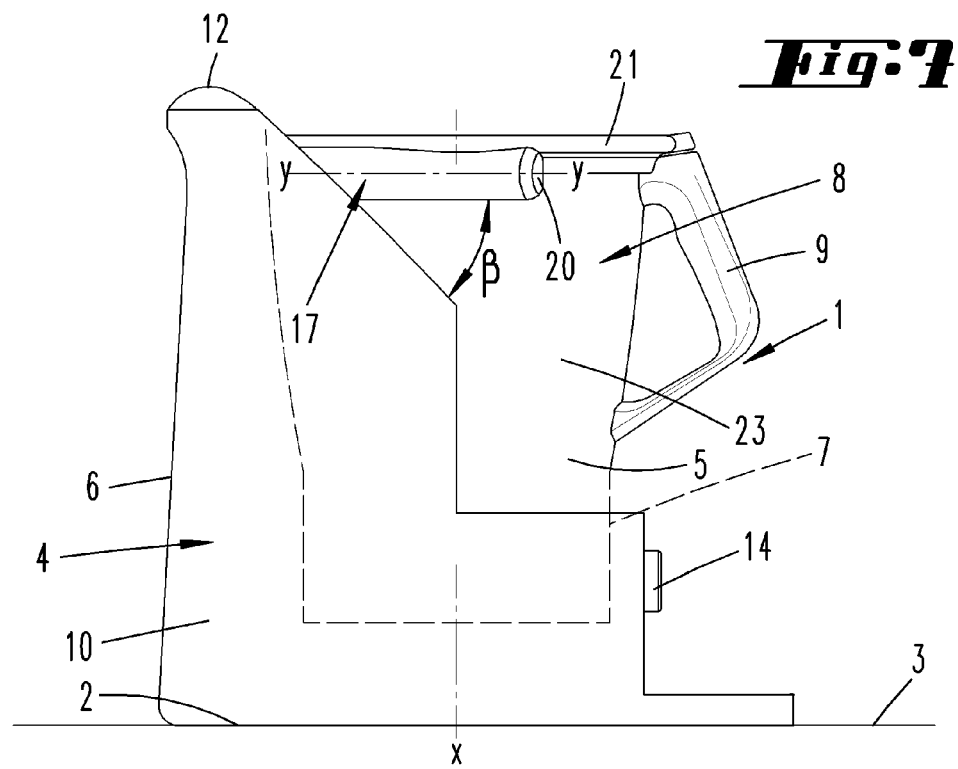
FIG. 7 shows the side view in relation hereto.
Figure 8:
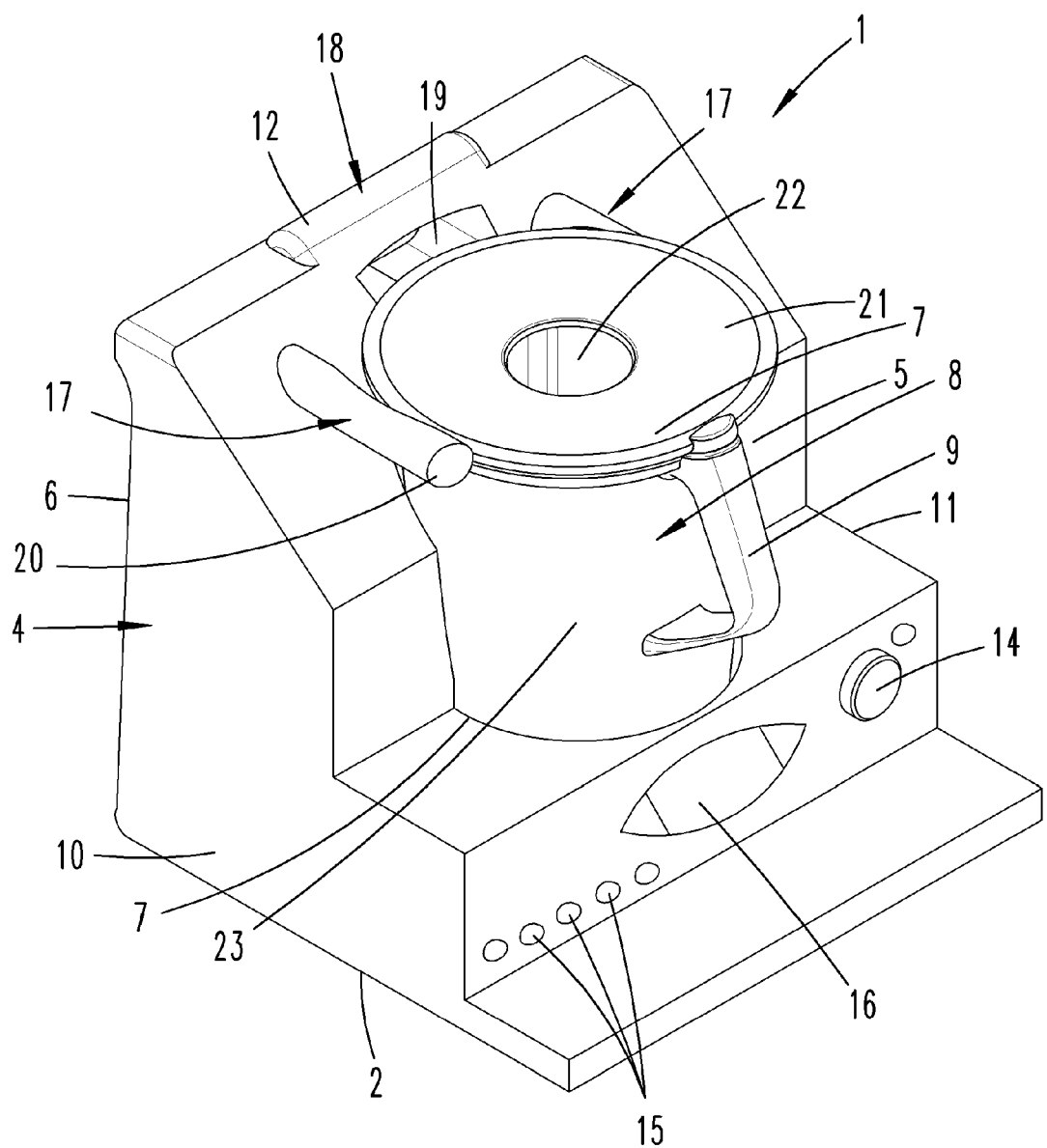
FIG. 8 shows a perspective illustration corresponding to FIG. 5, but with arrangement of a cooking vessel in the food processor.

The visible side of the front side 5 is stepped. Although not illustrated, the front side may also be flat over the entire area, merely with the exception of an approximately central region with reference to a plan view according to FIG. 3, in which region the front side 5 is interrupted by a holder 7 for a cooking vessel 8. The holder 7 is formed in the manner of a pot-shaped indentation starting from the surface of the front side 5 and extending vertically downwardly in the direction of the standing surface 2. For operation of the food processor 1, a cooking vessel 8 can be received in this holder 7, in particular in the region of the base portion thereof, more preferably with a form fit (see FIGS. 6 to 8). A handle 9 arranged on the cooking vessel 8 preferably points, in the position of assignment of the cooking vessel 8 in the holder 7 (in a projection onto the standing surface 2), in the direction of the front edge, possibly in the direction of the alternatively specified heavily rounded triangle tip of the standing surface 2.

Figure 2:
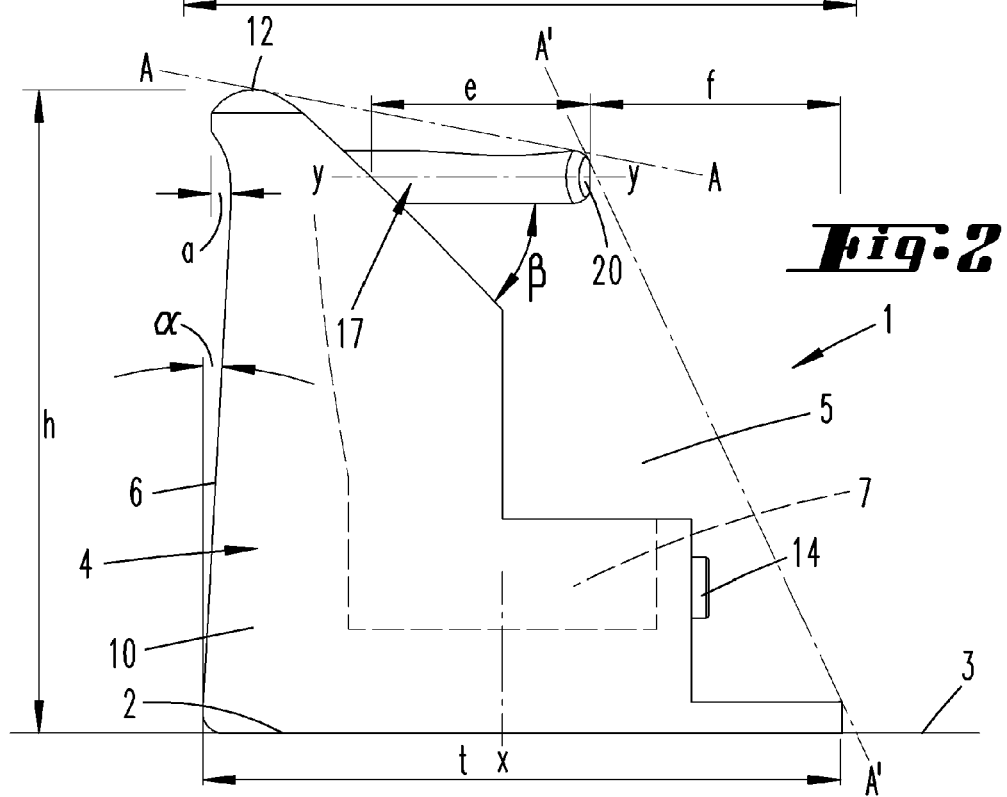
FIG. 2 shows the side view hereto.

The rear side 6 of the machine housing 4 extends, with reference to a side view according to FIG. 2, at an acute angle $\alpha$ to a vertical oriented perpendicularly to the standing surface 2, more preferably at an acute angle $\alpha$ of approximately 5° with an inclination in the direction of the front side 5.

The rear side 6 transitions in a manner substantially following the course of the contour of the standing surface 2 into side regions 10, which carry the front side 5.

Figure 1:
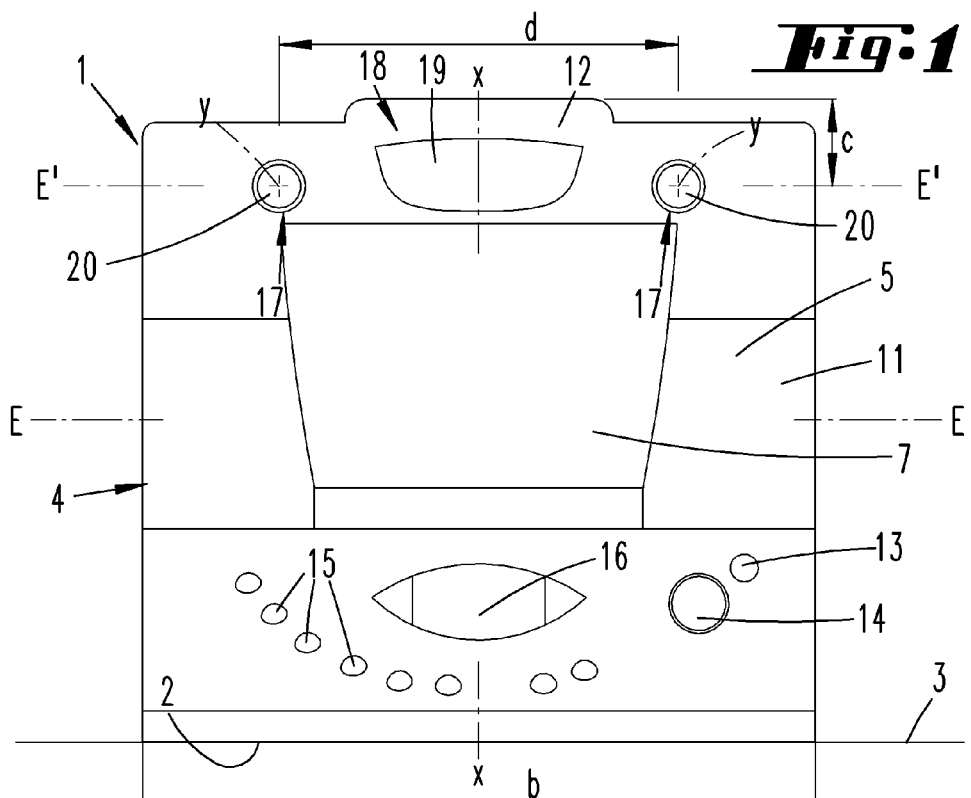
FIG. 1 shows a food processor of the discussed type in a view from the front.

With reference to a front view according to FIG. 1, the edge 11 of the front side 5 is substantially angular on either side of a vertical machine center axis x, but can also be curved continuously, although this is not illustrated, here starting initially from a region facing the standing surface 2 and in each case increasing outwardly and then decreasing after exceeding approximately a plane E halving the height of the food processor 1 as a whole.

In particular in the region of the zenith 12, the front side 5 also extends partially, in a region of the edge 11 on either side of the zenith 12, in a vertical projection in a manner protruding beyond the rear side 6 at least partially, more preferably with a protrusion amount a, which corresponds approximately to half the horizontal spacing between the vertically lower edge of the rear side 6 and the vertically upper edge of the rear side 6 as a result of the angled positioning of the rear side 6.

Part of the front side 5 running preferably continuously, in an angled or oblique manner on the whole is a control panel 13. This extends substantially below the plane E halving the total height of the food processor 1, more preferably below the holder 7 for the cooking vessel 8.

The control panel 13 preferably has a plurality of controllers 14 and/or keys 15, and more preferably a display 16 for displaying the parameters to be set in particular via the controllers 14 and/or keys 15, such as an agitator speed of an agitator provided in the cooking vessel 8 and/or the heating temperature of a heater acting on the cooking vessel 8 or on the food in the cooking vessel 8 and/or the time for which the agitator and/or the heater is/are operated.

The controllers 14 and/or keys 15, and additionally also the display 16 where applicable, are two-dimensional in relation to the surface of the front side 5 in one embodiment, or alternatively, as also illustrated, are raised with respect to the surface of the front side 5, therefore in particular a controller 15, for example.

With reference to a side view according to FIG. 2, the food processor 1, in particular the machine housing 4 thereof, has a depth t, which corresponds substantially to the height h of the housing, and additionally, as is more preferred, also the width b of the housing considered transversely hereto.

In the region extending above the halving plane E, rod parts 17 projecting freely toward the front are arranged in the region of the front side 5 above the free surface, that is to say the visible face. The center axes y of said rod parts preferably run parallel to one another, more preferably, in a position of the food processor 1 in relation to the standing surface 2 or in an ordinary position of the food processor 1 according to FIG. 1, in a plane E' running parallel to the surface 3, said plane E' being distanced downwardly with a vertical distance c from the vertically highest point of the food processor 1 in the region of the zenith 12, which distance c corresponds preferably to one fifth to one tenth, more preferably approximately one eighth, of the machine height h.

In this region of the front side 5 extending above the plane E, a grip region 18, which can be grasped, is further preferably assigned to the zenith 12, moreover with continued, accordingly uninterrupted contour of the front side 5. To this end, a grip opening 19 is provided, which opens both toward the front side 5 and preferably toward the rear side 6, so as to thus allow the grip region to be grasped. A vertically lower edge of the grip opening 19 preferably extends at the height of the plane E' defined by the center axis y of the rod parts 17.

The rod parts 17 are arranged on either side of the center axis x at the same distance therefrom, wherein the horizontal distance d between the rod parts 17, in relation to the center axes y thereof, corresponds approximately to half the amount of the width extent b of the food processor 1.

The rod parts 17 are preferably formed identically, particularly symmetrically with respect to the center axis x of the food processor 1. Here, each rod part 17 has a substantially cylindrical design with a cross section in the shape of a circular disk. Here, each rod part 17 protrudes freely beyond the visible face of the front side 5, more particularly passing through the machine housing 4 in the region of the front side 5 so as to be fixed in the region of the housing interior. Here, the center axis y of each rod part 17 preferably encloses an angle β of approximately 45° to the facing surface of the front side 5.

In one embodiment, each rod part 17 is preferably circular cylindrical over the entire at least freely projecting length. In a further embodiment, as is also illustrated, the rod part 17 is formed merely partially in a circular disk-shaped manner in different regions over the freely projecting length of said rod part, wherein the rod part 17 is in any case received on the whole in a virtual cylinder jacket of which the diameter is defined by a maximum circular disk diameter of the rod part 17.

The length e, projecting freely beyond the front side 5, of the center axis y of any rod part 17 preferably corresponds for example to one third of the device depth t or of the device width b. Accordingly, the free front end 20 is set back in the direction of the rear side 6 with respect to the furthest-forward-projecting extent of the food processor 1, more preferably by a set-back amount f, which corresponds approximately to half the depth extent amount t of the food processor 1, more preferably approximately half the distance d between the center axes y of the rod parts 17.

The holder 7 for the cooking vessel 8 is more preferably arranged such that the center axis x of the food processor 1 passes through this holder 7 preferably centrally, wherein the edge of the holder 7 running around in the front side 5 more preferably extends uniformly above and below the center plane E with respect to a front-end view according to FIG. 1.

The food processor 1 is illustrated in FIGS. 6 to 9 in a preferred position of use. A cooking vessel 8 is received in the holder 7. The cooking vessel 8 preferably has an agitator in the base region. This agitator is preferably coupled with a form fit to an agitator drive provided in the food processor 1 when the cooking vessel 8 is in the position of assignment in the holder 7.

The cooking vessel 8 is more particularly closed by a lid 21 during operation of the agitator and/or during operation of a heater. This lid, preferably centrally, has a filling opening 22, receiving the center axis x of the food processor 1 and therefore also the vertical axis of the cooking vessel 8, more preferably with a basic outline of the lid 21 that is substantially circular disk-shaped on the whole.

The cooking vessel 8 has a vessel wall 23 extending upwardly from the base region in the vertical direction.

Particularly during operation of the food processor 1, more particularly during operation of the agitator and/or heater, the lid 21 fitted on the cooking vessel 8 is to be locked, since high forces, for example caused by a comminution process by means of the agitator and/or by fluid dynamics in the cooking vessel 8 may be produced during operation of the food processor 1. To this end, the rod parts 17 are used in a preferred embodiment and are each mounted in the machine housing 4 rotatably about the center axis y thereof. The rod parts 17 are designed to grasp around assigned lid edge regions in a fixing manner. With respect to the further embodiment and operating principle, reference is made to document DE 10 2011 051149 A1 cited in the introduction. The content of this patent application is hereby incorporated fully into the disclosure of the present invention, also for the purpose of including features of this patent application in claims of the present invention.

During subsequent operation of the food processor 1, that is to say with inserted cooking vessel 8, the food processor 1 can preferably be lifted by means of the grip region 18, for example in order to move the food processor 1. Alternatively, the food processor 1 can also be grasped in this operating position in the region of the rod parts 17 in order to be carried.

The previously described geometry of the food processor 1 and particularly the rod parts 17 protruding beyond the visible face of the front side 5 additionally provide favorable possibilities for standing the food processor 1 in other positions deviating from the conventional working position according to FIG. 1, for example for cleaning and/or maintenance or repair purposes.

In accordance with the illustration in FIG. 9, the food processor 1 can thus be placed virtually on its back, wherein the food processor 1 is supported here substantially over points or linearly on the portion of the front side 5 projecting freely beyond the rear side 6 and over points or linearly on the edge region of the rear side 6 assigned to the standing surface 2. As a result of the angled orientation of the rear side 6 with respect to a perpendicular in relation to the standing surface 2, the rear side 6 does not rest over its entire area on the support, for example the surface 3. The contact over points or the linear contact accordingly protects the surface of the rear side 6 against damage, for example scratches. The food processor 1 can also be pivoted out from this position on one or another side, virtually about an axis parallel to the center axis x, until in a position in which support on the surface 3 is provided via the facing rod part 17. A stable lateral position of the food processor 1 can thus be adopted.

Figure 11:
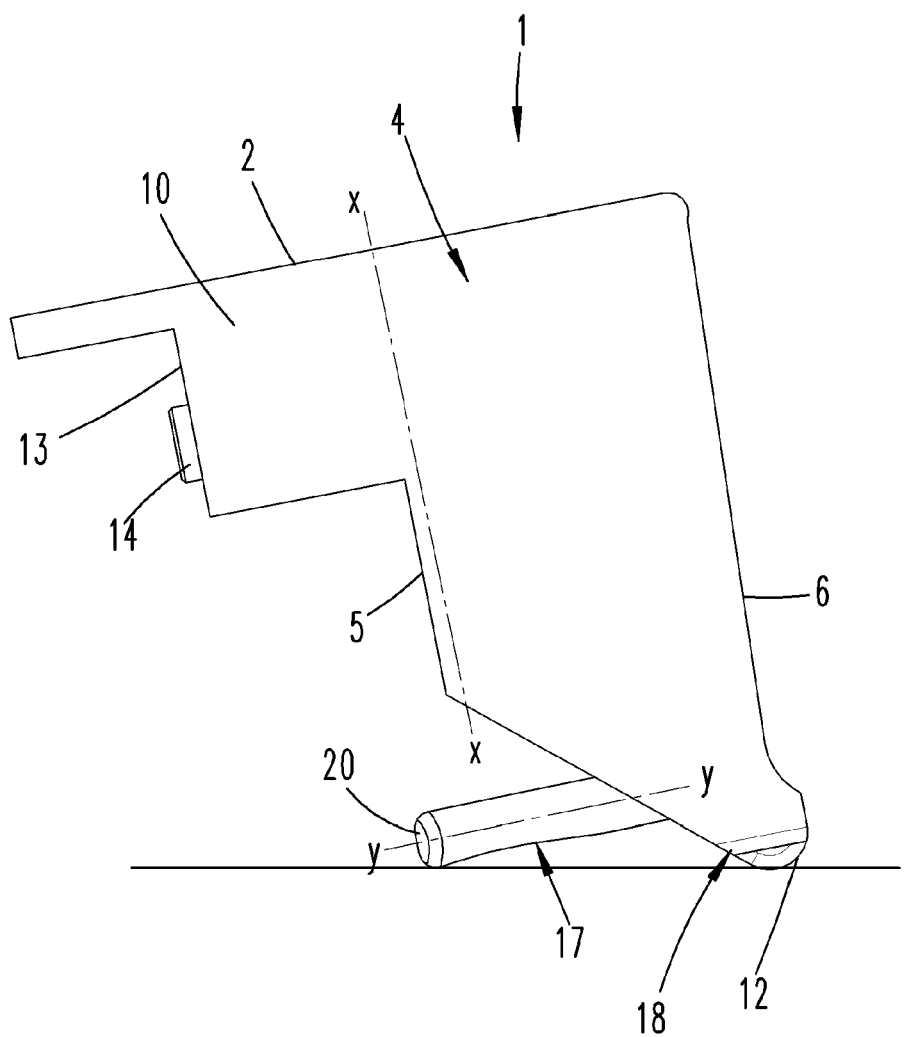
FIG. 11 shows an illustration corresponding to FIG. 10, but with support via the rod parts and a region of the front side assigned to the rear side.

A placement of the food processor 1 on the surface 3 virtually in an upside-down position according to FIGS. 10 and 11 is also made possible, in each case with protection of the surface of the front side 5 formed for example in a high-quality manner preferably for design reasons. To this end, the rod parts 17 are used as spacer supports so as to thus distance the surface of the front side 5 from the surface 3.

As can be seen in particular from the illustration in FIG. 2, a support plane A can be spanned between the free ends 20 of the rod parts 17 and the region of highest extent of the food processor 1 (here in the region of the zenith 12), as can a support plane A' between the free ends 20 of the rod parts 17 and the region of the front side 5 distanced maximally from the rear side 6. Here, any controllers 14 and/or keys 15 are preferably selected, in terms of the extent thereof going beyond the plane of the front side 5, such that they do not protrude beyond the support plane A'.

FIG. 10 thus illustrates a position of the food processor 1 in which said food processor is supported on the surface 3 in the support plane A' via the standing-surface-side end region of the front side 5 and the free ends 20 of the rod parts 17. Here, a stable position of placement of the food processor 1 is achieved, which for example allows the cleaning of the housing and also the maintenance of the machine.

A support of the food processor 1 in the region of the support plane A is illustrated in FIG. 11. Here, support is provided via the end regions of the rod parts 17 and substantially via the zenith region of the peripheral edge 11 of the front side 5. A stable placement of the food processor 1 on the surface 3 is also preferably achieved as a result and in particular allows favorable access to the underside of the food processor 1.

In addition, the food processor 1 can be carried favorably, when the cooking vessel 8 is removed from the holder 7, by grasping the rod parts 17. The rod parts 17 accordingly form bar-like grip parts.

All disclosed features are (per se) essential to the invention. The content of the disclosure of the associated/appended priority documents (duplicate of the pre-application) is also hereby fully incorporated into the disclosure of the application, also for the purpose of including features of these documents in the claims of the present application. In the optionally independent version thereof, the dependent claims characterize independent inventive developments of the prior art, in particular in order to produce divisional applications on the basis of these claims.

| List of reference signs: | |
|---|---|
| 1 food processor | a protrusion amount |
| 2 standing surface | b width |
| 3 surface | c distance |
| 4 machine housing | d width |
| 5 front side | e length |
| 6 rear side | f set-back amount |
| 7 holder | h height |
| 8 cooking vessel | t depth |
| 9 handle | x center axis |
| 10 side region | y center axis |
| 11 edge | A support plane |
| 12 zenith | A' support plane |
| 13 control panel | E plane |
| 14 controller | E' plane |
| 15 key | α angle |
| 16 display | β angle |
| 17 rod part | |
| 18 grip region | |
| 19 grip opening | |
| 20 end | |
| 21 lid | |
| 22 filling opening | |
| 23 vessel wall | |

What is claimed is:

1. A food processor comprising:
a lower standing surface, a rear side and a front side, wherein the front side, starting from the highest location of the food processor assigned to the rear side, is formed obliquely in relation to vertical and a holder for a cooking vessel is formed in the front side, wherein, furthermore, freely projecting rod parts are formed in an upper region of the food processor, wherein the front ends of the rod parts are arranged on the same horizontal plane and are set back toward the rear side of the food processor with respect to a furthest-forward projecting extent, characterized in that the set-back amount corresponds to 25% to 50% of the largest extent of the food processor as seen in the depthwise direction in the standing-surface region of the food processor, wherein the amount, at the same time, corresponds to approximately half the horizontal distance between the longitudinal center axes of the rod parts, wherein, furthermore, the contour of the front side is always rounded in the region of the rod parts.

2. The food processor as claimed in claim 1, characterized in that the food processor has a control panel on the front side, and in that the control panel is formed in a manner running perpendicularly or is part of a continuous, obliquely running front side.

3. The food processor as claimed in claim 1, characterized in that the rear side, in relation to a side view, runs at an incline to the front side, enclosing an acute angle to a vertical, wherein an edge termination of the front side protrudes partially beyond the rear side in a vertical projection.

4. The food processor as claimed in claim 1, characterized in that the greatest width of the front side is formed with a different width below the rod parts.

5. The food processor as claimed in claim 1, characterized in that the horizontal distance between the rod parts, in relation to the center axes thereof, corresponds to 40% to 60% of the greatest width of the front side.

6. The food processor as claimed in claim 1, characterized in that a grip region, which can be grasped, is formed in the region of the highest extent.

7. The food processor as claimed in claim 1, characterized in that the freely projecting length of the rod parts, in relation to a center axis, corresponds to 20% to 50% of the greatest depth of the food processor.

8. The food processor as claimed in claim 1, characterized in that the center axes of the rod parts enclose an acute angle to the front side over the entire freely projecting length of the rod parts, in relation to a side view.

\* \* \* \* \*